3,592,847
PROCESS FOR THE PURIFICATION OF TEREPHTHALIC ACID
Robert M. Gallivan, Jr., Buffalo, John H. Bonfield, East Aurora, and Richard C. De Long, Snyder, N.Y., assignors to Allied Chemical Corporation, New York, N.Y.
No Drawing. Filed May 2, 1968, Ser. No. 726,206
Int. Cl. C07c 51/42
U.S. Cl. 260—525                                                     11 Claims

ABSTRACT OF THE DISCLOSURE

Purification of crude terephthalic acid contaminated with 4-carboxybenzaldehyde, p-toluic acid and other impurities by recrystallizing said crude terephthalic acid from a mixed solvent comprising an anhydride of a lower alkanoic acid and more than two molar proportions of a lower alkanoic acid per molar proportion of crude terephthalic acid. The purified terephthalic acid is suitable for use directly as a monomer for the preparation of high molecular weight polyesters.

---

Terephthalic acid is employed in large quantities for the preparation of high molecular weight polymers, particularly polyethylene terephthalate, which can be prepared directly from terephthalic acid and ethylene glycol, but only if the terephthalic acid is of high purity. Terephthalic acid is generally prepared by oxidation of p-xylene, either with air or other oxygen-containing gas, with nitric acid, or with a sulfur-containing oxidant, such as sulfur trioxides. For example, U.S. Pats. 2,552,268 issued May 8, 1951, to Emerson et al., 2,853,514 issued Sept. 23, 1958, to Brill, and Belgian Pat. 648,155 disclose processes for oxidizing p-xylene. However, terephthalic acid prepared according to these processes contains as impurities other oxidation products including p-toluic acid and 4-carboxybenzaldehyde as well as residues of heavy metal oxidation catalysts such as manganese or cobalt salts. In order to utilize terephthalic acid directly as a monomer for the preparation of high molecular weight polyesters, the maximum levels of these impurities which can be present in the terephthalic acid are about 30 p.p.m. each of p-toluic acid and 4-carboxybenzaldehyde and about 40 p.p.m. of heavy metals. These impurities are incompletely removed by conventional purification procedures such as washing with hot alkanoic acid or water, even after repeated washings.

The prior art discloses several methods for the recrystallization of terephthalic acid, but they too have proven unsatisfactory for removing impurities, and extreme conditions of temperature and/or pressure are required.

British Pat. 785,051 discloses a purification process whereby crude terephthalic acid is recrystallized from an alkanoic acid. However, the low solubility of terephthalic acid in an alkanoic acid such as acetic acid requires the use of very high temperatures, above about 210° C., and superatmospheric pressures to recrystallize terephthalic acid in commercial quantities. Further, under these conditions only about a five-fold decrease in the 4-carboxybenzaldehyde present in the starting material is obtained, and numerous recrystallizations are required to obtain terephthalic acid of sufficient purity for use as a monomer.

Terephthalic acid can be recrystallized from an alkanoic anhydride also, as disclosed in German Pat. 1,136,-999 issued Sept. 27, 1962, but again the low solubility of terephthalic acid in an anhydride such as acetic anhydride severely limits the amount of terephthalic acid that can be recrystallized at atmospheric pressure, and only about a fourfold decrease in the 4-carboxybenzaldehyde content is achieved according to this process.

Thus, it is a principal object of the present invention to provide an improved process for the purification of crude terephthalic acid.

It is another object to provide a process for the purification of crude terephthalic acid at economic temperatures and pressures.

It is a further object to provide a process for the purification of terephthalic acid so that less than 30 p.p.m. each of 4-carboxybenzaldehyde and p-toluic acid remain.

Further objects will become apparent from the following detailed description thereof.

It has been discovered that crude terephthalic acid can be purified to remove 4-carboxybenzaldehyde, p-toluic acid, and heavy metal residues by dissolving the crude terephthalic acid in a solvent containing at least 4.4 mols of an anhydride of a lower alkanoic acid for each mol of terephthalic acid present, heating the solution, optionally in the presence of an acid catalyst, adding more than two mols of a lower alkanoic acid for each mol of terephthalic acid present and precipitating the terephthalic acid. The lower alkanoic acid can be added with the anhydride during dissolution, forming a mixed solvent, or after the terephthalic acid solution has been heated, but prior to precipitation of the purified product. The process of the invention is effective for the purification of terephthalic acid obtained from the oxidation of p-xylene, prepared by any conventional process whereby terephthalic acid is produced contaminated with the above-described impurities. Recrystallization from the mixed solvent as described above removes surprisingly high quantities of 4 - carboxybenzaldehyde, more than would be expected based on the amount removed by recrystallization from either of these solvents used alone as is taught by the prior art processes. In addition to removing large quantities of 4-carboxybenzaldehyde, the process of the invention is effective for the removal of p-toluic acid and heavy metal oxidation catalyst residues as well. According to this process, terephthalic acid is prepared which is suitable for direct esterification with ethylene glycol to prepare high molecular weight polymers.

According to one embodiment of the process of the invention, crude terephthalic acid obtained from the oxidation of p-xylene is dissolved in a mixture of an anhydride of a lower alkanoic acid and a lower alkanoic acid. In order to obtain complete dissolution, it was found that at least 4.4 mols of the anhydride and more than 2.0 mols of the acid per mol of terephthalic acid present are required. Water should be substantially absent from the solution during dissolution since water will react with the anhydride to form additional acid. Solution can be effected by agitating at an elevated temperature, under superatmospheric pressure if necessary. After heating the terephthalic acid solution, the product is recovered by cooling the solution to precipitate the terephthalic acid which can be collected by conventional means, as by filtration.

According to a preferred mode of carrying out our invention, the crude terephthalic acid is first dissolved by heating in the alkanoic acid anhydride. After heating the terephthalic acid solution, it is added to the alkanoic acid to precipitate the terephthalic acid product. Preferably the mixture is not allowed to cool more than about 25° C. during this step. Alternatively, sufficient water can be added to an anhydride solution containing excess anhydride to form the required amount of acid by reaction with the excess anhydride.

Further, according to our preferred process, the hot terephthalic acid-anhydride solution is contacted with an acid catalyst, preferably in the presence of air or other oxygen-containing gas, prior to precipitation of the terephthalic acid. The acid catalyst can be added during dissolution or after complete dissolution of the terephthalic acid.

Advantageously, the lower alkanoic acid produced as the terephthalic acid dissolves in the anhydride is removed during the dissolution. Although the exact mechanism of the dissolution is unknown, it is believed that at least some of the terephthalic acid reacts with the lower alkanoic anhydride solvent forming a terephthalic anhydride and the lower alkanoic acid corresponding to the alkanoic anhydride solvent. This reaction is reversed when the solution is cooled. The terephthalic anhydride apparently is more soluble than terephthalic acid in the alkanoic anhydride, and thus solutions of high concentration, up to about 27 percent by weight at reflux temperatures, are obtainable by removing the alkanoic acid formed during dissolution, compared to a maximum of about 7 percent by weight concentration obtained without removing the alkanoic acid. Thus, less alkanoic anhydride solvent is required for solution of the terephthalic acid, and solution can be effected without employing extremes of temperature or pressure.

The alkanoic acid produced by the reaction between terephthalic acid and the alkanoic anhydride can be removed during dissolution of the terephthalic acid by any suitable means, such as by treating the mixture with a ketene at elevated temperatures to convert the alkanoic acid formed back to the anhydride. The temperature is maintained above about 110° C. during this step, preferably above about 130° C. Ketenes suitable for use during this step are those having from 2 to 5 carbon atoms, including ketene, methyl ketene, ethyl ketene, dimethyl ketene, and the like. Alternatively, the terephthalic acid/anhydride mixture can be maintained at a temperature above the boiling point of the alkanoic acid and the alkanoic acid distilled off as it is formed. When the alkanoic acid is removed by distillation, it is desirable to charge additional anhydride to compensate for anhydride values lost as the alkanoic acid. Additional anhydride can be added prior to distillation or during the distillation.

The lower alkanoic anhydrides useful in the process of the invention are anhydrides of alkanoic acids having from 2 to 5 carbon atoms. Suitable anhydrides include acetic anhydride, propionic anhydride, n-butyric anhydride, isobutyric anhydride, n-valeric anhydride, and the like. Mixtures of two or more anhydrides can also be employed.

The lower alkanoic acids useful in the present process are those having from 2 to 5 carbon atoms. Suitable acids include acetic acid, propionic acid, n-butyric acid, isobutyric acid, n-valeric acid, cyclopropylcarboxylic acid, and the like. Preferably, the acid employed will be the acid corresponding to the anhydride used, as acetic acid with acetic anhydride, n-butyric acid with n-butyric anhydride, etc.

Acid catalysts optionally employed in the preferred mode of the invention include carboxylic acids having an acid dissociation constant greater than that of terephthalic acid, i.e. greater than about $3 \times 10^{-4}$ at ambient temperatures, such as trichloroacetic acid, Lewis acids, such as aluminum chloride, non-carboxylic organic acids, such as p-toluene sulfonic acid and methane sulfonic acid, mineral acid salts, such as sodium dihydrogen ortho phosphate, tris(hydroxylammonium) ortho phosphate, liquid or solid acidic organic ion exchange resins, mineral acids, such as orthoboric acid and orthophosphoric acid, and mineral and clay catalysts, such as montmorillonite, acid-activated montmorillonite, attapulgite, kaolin, and halloysite. The amount of catalyst used is not critical and in general from about 0.1 to about 5 percent by weight of catalyst based on the weight of terephthalic acid present is employed. However, when a solid bed of catalyst is employed, up to 30 percent by weight or more of catalyst can be employed. A solid, insoluble catalyst is generally preferred in our process since it can be readily removed from the terephthalic acid solution by filtration.

The temperature employed to dissolve the terephthalic acid will depend upon the alkanoic anhydride and alkanoic acid used, the amount of terephthalic acid being purified, and the exact method of recrystallization employed. Conveniently, the recrystallization mixture is heated to a temperature sufficient to dissolve at least about 2 percent by weight of terephthalic acid in the solvent employed, i.e. either the mixed solvent of the alkanoic acid and the alkanoic anhydride, or the anhydride alone. According to the preferred mode of the invention, the terephthalic acid-alkanoic anhydride solution is heated at reflux temperatures or above.

The concentration of terephthalic acid in the recrystallization solvent should be at least 20 percent, preferably at least 70 percent, of saturation at the temperature employed to avoid handling large excesses of solvent. Preferably, we employ a solvent mixture containing from about 1.7 to about 6.8 mols of alkanoic acid per mol of alkanoic anhydride.

In the preferred mode of the invention, the time required for heating the terephthalic acid in the alkanoic anhydride solution can vary from a few minutes to several days. In the absence of a catalyst, the solution is heated for from about 5 to about 96 hours or more, and in general for from about 6 to about 10 hours. When an acid catalyst is employed, as little as five minutes may be required for satisfactory results, and advantageously heating will be continued for from about thirty to about sixty minutes after the terephthalic acid dissolves.

If desired the terephthalic acid solution can be treated with a decolorizing agent, such as adsorbent carbon, prior to precipitating the product.

The solid terephthalic acid product obtained according to the present process is washed with hot alkanoic acid or water and dried. The purified product may contain a small amount of occluded alkanoic acid which cannot be completely removed by conventional washing, but can be removed readily by dissolving the terephthalic acid product in water and reprecipitating it. Alternatively, the alkanoic acid can be removed by dissolving the terephthalic acid product in pyridine, adding water as required to distill off the pyridine as a pyridine/water azeotrope and recovering the reprecipitated terephthalic acid from the distill and filtration or other conventional means.

The recrystallization process of the present invention can be repeated one or more times as required to obtain the desired purity.

If desired the alkanoic anhydride solvent can be distilled from the mother liquor obtained in the present recrystallization process and recovered for recycling and purification of additional quantities of crude terephthalic acid. The residue will contain 4-carboxybenzaldehyde and p-toluic acid and/or the products of their reaction with the alkanoic anhydride which can be recycled to the oxidation step to increase the overall yield of terephthalic acid. The process of the invention can be adapted to either batchwise, semicontinuous or continuous operation.

Crude terephthalic acid can be purified according to the process of the present invention in a single recrystallization to contain less than 30 p.p.m. each of p-toluic acid and 4-carboxybenzaldehyde and less than 40 p.p.m. of heavy metal residues. The purified terephthalic acid obtained is eminently suitable for use directly as monomer for preparation of high molecular weight polymers, particularly polyethylene terephthalate.

The invention can be illustrated further by the following examples, but it is to be understood that the invention is not to be limited to the details disclosed therein.

In the examples, all parts and percentages are by weight unless otherwise noted. The terephthalic acid employed was obtained by the oxidation of p-xylene according to the process disclosed in Belgian Pat. 648,155.

EXAMPLE 1

(A) 50 parts of crude terephthalic acid containing 0.91% of 4-carboxybenzaldehyde, 475 parts of acetic anhydride and 475 parts of glacial acetic acid were charged to a titanium autoclave and were heated and agitated at 190° C. under a nitrogen atmosphere at a pressure of about 750 p.s.i.g. for thirty minutes. The mixture was cooled under pressure to about 42° C. over a seven-hour period, discharged from the autoclave, and the product recovered by filtration. The product was washed by boiling in 500 parts of water for thirty minutes and recovered by filtration at 100° C. The filter cake was washed with 1500 parts of water and heated to 95° C. and dried at 100° C. under vacuum for sixteen hours.

39 parts of terephthalic acid containing 0.054% of 4-carboxybenzaldehyde were obtained (corresponding to a removal of 95.2% or a 16.9-fold reduction in the 4-carboxybenzaldehyde present in the starting material).

This process was compared to recrystallization processes using glacial acetic acid alone and acetic anhydride alone as solvents, as given below in parts (B), (C) and (D).

(B) 50 parts of the crude terephthalic acid described above and 950 parts of glacial acetic acid were charged to an autoclave and heated as above for two hours at 260° C. under a nitrogen atmosphere at a pressure of about 700 p.s.i.g. The mixture was cooled under pressure to about 110° C. over a two-hour period. The contents were discharged, the autoclave rinsed out with two 3500-part portions of glacial acetic acid, and the washings combined with the terephthalic acid mixture. The product was filtered off, washed by boiling with 1500 parts of water for thirty minutes, and filtered hot. The product was washed with an additional 1500 parts of hot water and dried at 100° C. under vacuum for sixteen hours.

39 parts of terephthalic acid containing 0.19% of 4-carboxybenzaldehyde were obtained (corresponding to removal of only 79.2% or a 4.8-fold reduction of the 4-carboxybenzaldehyde present in the starting material).

(C) 6 parts of crude terephthalic acid containing 1.83% of 4-carboxybenzaldehyde and 100 parts of acetic anhydride were heated at reflux for thirty minutes. The solution was cooled to room temperature, and the product filtered off.

The terephthalic acid obtained contained 0.5% of 4-carboxybenzaldehyde (corresponding to removal of only 72.7% or a 3.7-fold reduction of the 4-carboxybenzaldehyde present in the starting material).

(D) The procedure given in part (C) above was repeated using crude terephthalic acid containing 0.44% of 4-carboxybenzaldehyde. An unsatisfactory result was obtained.

The above example demonstrates that use of the mixed solvent of the invention unexpectedly is many times more effective as a recrystallization medium for removing 4-carboxybenzaldehyde than use of either solvent alone.

EXAMPLE 2

100 parts of of crude terephthalic acid containing 0.44% of 4-carboxybenzaldehyde and 0.42% of p-toluic acid were charged to a vessel containing 1730 parts of acetic anhydride. The mixture was heated at 135–140° C. for forty-five minutes until the terephthalic acid dissolved. 5 parts of Filtrol 20 (trademark of Filtrol Corporation for a powdered acid-activated montmorillonite clay catalyst) which had been dried at 180° C. were added and the resultant mixture heated at 135°–140° C. with stirring for four hours. The catalyst was filtered off, and the hot solution was added to 2100 parts of glacial acetic acid preheated to 118° C. The precipitated product was filtered off, washed with 126 parts of hot glacial acetic acid, and dried at 100° C. for sixteen hours.

94 parts of terephthalic acid containing 0.023% of 4-carboxybenzaldehyde (corresponding to removal of 95% or a 19.1-fold reduction in the 4-carboxybenzaldehyde present in the starting material) were obtained.

The recrystallization procedure was repeated employing 90 parts of the terephthalic acid obtained above, 1620 parts of acetic anhydride, and 2415 parts of glacial acetic acid.

85 parts of terephthalic acid were recovered containing 0.0018% of 4-carboxybenzaldehyde (corresponding to removal of 92.3% of the 4-carboxybenzaldehyde present in the terephthalic acid charged and 99.8% of the 4-carboxybenzaldehyde present in the crude starting material) and 0.003% of p-toluic acid (corresponding to removal of 99.4% of p-toluic acid present in the crude starting material).

EXAMPLE 3

600 parts of crude terephthalic acid containing 0.33% of 4-carboxybenzaldehyde were charged to a still fitted with a fractionating column vented to a condenser and containing 3200 parts of acetic anhydride. The mixture was heated with stirring at 136–145° C. for 7.5 hours while distilling off acetic acid.

100 parts by volume of the resultant solution were cooled to 100° C. and passed at a rate of about 2.2 parts by volume per minute at a pressure of about 100 mm. Hg through a column 10 cm. long and 2 cm. in diameter containing 27.3 parts of Filtrol 24 (trademark of Filtrol Corporation for an acid-activated montmorillonite clay catalyst having a particle size of from 20 to 60 mesh) which had been dried at 180° C. for about sixteen hours and washed with 108.2 parts of acetic anhydride. After the terephthalic acid solution had passed through the column, the column was washed with 54 parts of hot acetic anhydride. The hot washings and solution were combined and charged at 100° C. to 315 parts of boiling glacial acetic acid. The mixture was heated at 120° C. for fifteen minutes, filtered at 120° C., the product washed with about 68 parts of boiling glacial acetic acid, and dried at 100° C. for sixteen hours.

The terephthalic acid product contained 0.0074% of 4-carboxybenzaldehyde (corresponding to a 44.7-fold reduction of the 4-carboxybenzaldehyde present in the starting material).

The recrystallization procedure given above was repeated.

The terephthalic acid product contained 0.0027% of 4-carboxybenzaldehyde (corresponding to removal of 99.1% or a 122-fold reduction in the 4-carboxybenzaldehyde present in the starting material).

EXAMPLE 4

Crude terephthalic acid was purified according to the procedure given in Example 2 except that the solution of terephthalic acid in acetic anhydride was treated with 1%, based on the weight of terephthalic acid charged, of Montmorillonite KSF, an acid-activated montmorillonite product of Chemetron Corporation, and the hot solution was added to glacial acetic acid in an amount by weight equal to that of the acetic anhydride.

The terephthalic acid obtained contained 0.0039% of 4-carboxybenzaldehyde, 0.003% of p-toluic acid, 0.0011% cobalt, 0.03% of water, and 1.8% of acetic acid.

The acetic acid impurity was removed as follows:

200 parts of the terephthalic acid as prepared above and 2000 parts of water were charged to a titanium autoclave and heated with agitation for two hours at a temperature of 250° C. under pressure of about 625 p.s.i.g. The solution was cooled to about 90° C. and filtered. The product was collected, washed first with 550 parts of hot water and then with cold water. The product was dried at 90–95° C. under vacuum. No acetic acid was found in the recrystallized terephthalic acid product.

EXAMPLE 5

50 parts by volume of the terephthalic acid/acetic anhydride solution prepared as in Example 3 were added to 157.2 parts of boiling acetic acid, cooled to room temperature, and the product collected by filtration. The product was washed with acetic acid, dried in air for one hour and at 95° C. for one hour.

The terephthalic acid product contained 0.019% of 4-carboxybenzaldehyde and 3.2% of acetic acid.

The acetic acid impurity was removed as follows:

4 parts of the above product were heated in 24.6 parts of pyridine until a clear solution was obtained. The solution was filtered hot, and 60 parts of water were added. The mixture was heated at reflux, adding more water as required to distill off all the pyridine as a pyridine/water azeotrope. The resultant slurry was cooled to room temperature and the product recovered by filtration.

The terephthalic acid product was free of acetic acid.

It is apparent that many modifications and variations may be effected without departing from the novel concepts of the present invention, and the illustrative details disclosed herein are not to be construed as imposing undue limitations on the invention.

We claim:

1. A process for the purification of a crude terephthalic acid contaminated with 4 - carboxybenzaldehyde and p-toluic acid which comprises recrystallizing said terephthalic acid from a solution thereof in a solvent mixture comprising at least 4.4 mols of an anhydride of an alkanoic acid having from two to five carbon atoms and more than 2.0 mols of an alkanoic acid having from two to five carbon atoms, per mol of terephthalic acid.

2. The process as defined in claim 1 wherein solution of said crude terephthalic acid prior to recrystallization thereof is effected by heating said terephthalic acid in a solvent containing at least 4.4 mols of said anhydride and at least 2.0 mols of said alkanoic acid, per mol of terephthalic acid, and heating the resultant mixture at an elevated temperature.

3. The process as defined in claim 1 wherein solution of said crude terephthalic acid prior to recrystallization thereof is effected by heating said terephthalic acid in at least 4.4 mols of said anhydride, per mol of terephthalic acid present at an elevated temperature and contacting the resultant solution with at least 2.0 mols of said alkanoic acid.

4. The process as defined in claim 2 wherein from about 1.7 to about 6.8 mols of said alkanoic acid are employed for each mol of said alkanoic anhydride present.

5. The process as defined in claim 3 wherein from about 1.7 to about 6.8 mols of said alkanoic acid are employed for each mol of said alkanoic anhydride present.

6. The process as defined in claim 5 wherein dissolution of said crude terephthalic acid is effected in the presence of an acid catalyst.

7. The process as defined in claim 5 wherein said solution of crude terephthalic acid in anhydride is heated to at least its reflux temperature.

8. The process as defined in claim 5 wherein alkanoic acid produced by reaction between said terephthalic acid and said alkanoic anhydride is removed by treating the mixture with a ketene.

9. The process as defined in claim 5 wherein alkanoic acid produced by reaction between said terephthalic acid and said alkanoic anhydride is removed by distillation as formed.

10. The process as defined in claim 5 wherein said alkanoic acid is generated by addition of water to the solution of terephthalic acid in alkanoic acid anhydride.

11. The process as defined in claim 5 wherein said alkanoic anhydride is acetic anhydride and said alkanoic acid is glacial acetic acid.

References Cited

UNITED STATES PATENTS

| | | | |
|---|---|---|---|
| 1,685,634 | 9/1928 | Jaeger | 260—525 |
| 2,868,835 | 1/1959 | Jezl | 260—525 |
| 3,171,856 | 3/1965 | Kurtz | 260—525 |
| 3,364,256 | 1/1968 | Ichikawa et al. | 260—525 |

OTHER REFERENCES

March, Advanced Organic Chemistry, 1968, p. 587.

LEWIS GOTTS, Primary Examiner

R. S. WEISSBERG, Assistant Examiner